United States Patent Office 2,780,636
Patented Feb. 5, 1957

2,780,636

DI[TRI(ALKOXY)SILOXY]DIHYDROCARBYL SILANES

James R. Wright and Alfred Goldschmidt, El Cerrito, Calif., assignors to California Research Corporation, San Francisco, Calif., a corporation of Delaware No Drawing. Application June 16, 1954,
Serial No. 437,292

8 Claims. (Cl. 260—448.8)

This invention relates to novel silicate esters. More particularly, the invention is directed to a novel class of silicate esters of the polysiloxane type having improved properties.

Silicate esters, in general, are characterized by unusually good viscosity-temperature relationships and low volatility, which make them attractive as high-temperature hydraulic fluids and lubricants. Many of the esters, however, are unstable in the presence of water and this renders them objectionable for a great many uses.

We have now discovered a novel class of silicate esters of the polysiloxane type having improved properties, namely, the di[tri(alkoxy)siloxy] dihydrocarbyl silanes, wherein the alkoxy and hydrocarbyl groups contain from 2 to 10 carbon atoms each.

The polysiloxanes of the present invention possess outstanding properties which are considered desirable for hydraulic fluids and lubricants. Their hydrolytic stability is excellent, which, as stated above, is unusual for silicate esters. Furthermore, they are low in volatility and have good viscosity - temperature characteristics which permit their effective use over a wide range of temperatures.

The term "hydrocarbyl" as herein employed is a convenient expression denoting the definite and commonly-known class of hydrocarbon radicals having a valence of 1 which are well recognized in the chemical art.

The compounds of the invention are those of the type illustrated by the following structural formula

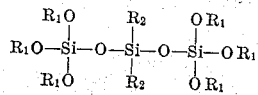

wherein the R₁'s, which may be the same as or different from one another, represent alkyl radicals of from 2 to 10 carbon atoms each, and the R₂'s represent the same or different hydrocarbon radicals of 2 to 10 carbon atoms each.

Illustrative alkyl groups which one or more of the R₁'s may represent are ethyl, n-propyl, isopropyl, n-butyl, sec.-butyl, tert.-butyl, n-amyl, 2-ethylbutyl, n-hexyl, n-octyl, isooctyl, 2-ethylhexyl, nonyl, decyl, etc.

The hydrocarbyl groups represented by the R₂'s may be alkyl, alkenyl, cycloalkyl, cycloalkenyl, aralkyl, alkylaryl, aryl, alkylarylalkyl, and the like in structure. Illustrative groups include ethyl, propyl, amyl, 2-ethylhexyl, decyl, propenyl, pentenyl, hexenyl, decenyl, cyclohexyl, ethylcyclohexyl, clclohexenyl, butylcyclohexyl, phenyl, tolyl, xylyl, t-butylphenyl, naphthyl, benzyl, ethylbenzyl, 1-cyclohexylethyl, etc.

Trisiloxanes illustrative of the invention as described above include:

Di[tri(propoxy)siloxy]dicyclohexylsilane
Di[tri(2-butoxy)siloxy]diphenylsilane
Di[tri(pentoxy)siloxy]diethylcyclohexylsilane
Di[tri(hexoxy)siloxy]di-t-butylphenylsilane
Di[tri(2-heptoxy)siloxy]diphenylsilane
Di[tri(octoxy)siloxy]dinaphthylsilane
Di[tri(propoxy)siloxy]diethylbenzylsilane
Di[tri(2-butoxy)siloxy]diethylsilane
Di[tri(2-hexoxy)siloxy]dipentenylsilane
Di[tri(2-heptoxy)siloxy]dicyclohexenylsilane
Di[tri(2-heptoxy)siloxy]diethylsilane
Di[tri(2-decoxy)siloxy]dipropenylsilane
Di[tri(2-decoxy)siloxy]di-1-cyclohexylethylsilane
Di[tri(2-heptoxy)siloxy]di-2-ethylhexylsilane The novel trisiloxanes of the invention may be prepared by several different methods. According to one method, 2 moles of a trialkoxysilanol containing from 2 to 10 carbon atoms in each of the alkoxy groups are reacted with 1 mole of a dihydrocarbyldihalosilane containing from 2 to 10 carbon atoms in each of the hydrocarbyl groups in the presence of an acid acceptor, such as pyridine. As an illustration of this type of reaction, tri(2-butoxy)silanol is reacted with diethyldichlorosilane in the presence of pyridine to give di[tri(2-butoxy)-siloxy]diethylsilane.

In another method of preparing the trisiloxanes of the invention, a novel process suitable for the preparation of trisiloxanes in general may be employed to a definite advantage. This process comprises reacting 2 moles of a trialkoxyhalosilane, or a monohalosilane in the general case, with 1 mole of a dihydrocarbyl silanediol, or a silanediol in the general case. In the specific case, as applied to the compounds of this invention, the alkoxy and hydrocarbyl groups contain from 2 to 10 carbon atoms each, as described above. An acid acceptor, such as pyridine, is employed to take up the halogen acid formed in the reaction. As an illustration of the specific method, tri(2-butoxy)chlorosilane is reacted with diphenyl silanediol to give di[tri(2-butoxy)siloxy]diphenylsilane. This new general method has the distinct advantage of permitting the use of silanediols in the preparation of valuable trisiloxanes. Thus, an entirely different class of reactants is made available for the production of these interesting new compositions, many of which could not otherwise be produced. Tremendous economic advantages as well as improved physical characteristics in the compositions are also made possible by the method. Greatly improved over-all yields are obtained resulting in lower costs and lessening separation problems and the possibility of product contamination.

In still another novel method, the trisiloxanes of the invention as well as other trisiloxanes in general may be advantageously prepared by a process which comprises reacting two moles of a silane of the group consisting of monohalosilanes and monohydroxylsilanes with one mole of a silane of the group consisting of dihydroxylsilanes and dihalosilanes in a reaction zone under anhydrous conditions, said halosilanes being reacted with said hydroxylsilanes, and passing an inert gas through the reaction zone to remove the hydrogen halide formed in the reaction. As an illustration of the specific method, tri(2-heptoxy)silanol is reacted with diethyldichlorosilane to give di[tri(2-heptoxy)siloxy]diethylsilane. This new general method is particularly advantageous in comparison with other methods in that it eliminates altogether the necessity for an acid acceptor, such as the pyridine mentioned above. The expensive and difficult operations required for removal of the acid acceptor hydrohalide salt formed in other processes are thus avoided in the method.

The following examples are given as additional illustrations of the invention. Unless otherwise specified, the proportions referred to are on a weight basis.

*Example 1*

A 500-ml. flask was charged with 115 grams of tri(2- heptoxy)silanol, 30 grams of pyridine and 75 mls. of xylene. 20 grams of dichlorodiethylsilane was then added dropwise. Immediately, a precipitate of pyridine hydrochloride was formed and the temperature rose to 47° C. After the addition was complete, the temperature was raised to reflux and maintained there for 7 hours.

Following the reaction, the flask was cooled and the liquid product layer decanted from the solid salt layer. The liquid product was stripped of xylene and fractioned. The di[tri(2-heptoxy)siloxy]diethylsilane was obtained as a cut boiling from 252 to 258° C. at 0.1 mm. mercury pressure. It gave the following analysis:

|  | Calculated | Found |
|---|---|---|
| Silicon------------percent-- | 9.72 | 9.41 |
| Molecular weight------------ | 762 | 743 |

Example 2

23.6 grams of diethyldichlorosilane were added dropwise to a mixture of 117 grams of tri(2-heptoxy)silanol and 75 cc. of xylene. During the addition, nitrogen gas was blown through the reaction mixture to remove hydrogen chloride formed. No acid acceptor was employed. After the addition, the temperature was raised to 135° C. over a 2-hour period and held at that point for 4 hours.

Following the reaction, the contents of the flask were cooled and then treated with ammonia to neutralize any dissolved hydrochloric acid that might remain. The liquid product was filtered, dried, stripped of xylene, and then fractionated to obtain the di[tri(2-heptoxy)siloxy]-diethylsilane as a cut boiling from 246 to 254° C. at 0.1 mm. mercury pressure and having the following analysis:

|  | Calculated, percent | Found, percent |
|---|---|---|
| Silicon------------ | 9.72 | 9.69 |

Example 3

144 grams of diphenylsilanediol were dissolved in 400 ml. of xylene and 200 ml. of pyridine. The solution was then charged to a 2-liter reaction flask. 388 grams of tri(2-butxoy)chlorosilane were then added dropwise over a 1-hour period to the reaction flask. The reaction temperature rose to 60° C. Following the addition, the temperature was raised to 144° C. and maintained at that temperature for 4 hours.

Following the reaction, the flask and its contents were cooled. The liquid product was decanted from the salt and stripped of xylene. The di[tri(2-butoxy)siloxy]-diphenylsilane was then obtained by distillation of the liquid product as a fraction boiling in the range 218 to 223° C. at 1 mm. mercury pressure. It gave the following analysis:

|  | Calculated, percent | Found, percent |
|---|---|---|
| Silicon------------ | 11.98 | 11.99 |

Example 4

A 500-ml. reaction flask was charged with 100 grams of tri(2-butoxy)silanol and 50 grams of pyridine. After cooling the contents of the flask to 10° F., 26 grams of dichlorodiethylsilane were added dropwise. When the addition was complete, the temperature was raised to 75° C. and held at that temperature for 2 hours.

Following the reaction, the reaction mixture was cooled and transferred to a separatory funnel. It was washed with three 250-ml. portions of water. The reaction mixture was then dried over sodium sulfate. Distillation of the mixture gave the di[tri(2-butoxy)siloxy]diethylsilane as a fraction boiling at about 177° C. under 1 mm. mercury pressure. It had the following analysis:

|  | Calculated, percent | Found, percent |
|---|---|---|
| Silicon------------ | 13.7 | 14.1 |

As an illustration of the superior properties of the novel trisiloxanes of the invention, a series of tests were carried out to determine their hydrolytic stability. In these tests three ml. portions of the trisiloxane to be tested were combined with three ml. of distilled water in a small glass vial equipped wtih a reflux condenser. A one-quarter inch piece of clean copper wire is added as catalyst. The vial and contents are placed on a hot plate where they are heated to 212° F. and maintained at that temperature for the duration of the test. Progressive decomposition stages are evidenced by (1) haze formation, (2) formation of precipitate, and (3) gel formation. Materials giving clear aqueous and silicate phases for at least 48 hours in the tests will satisfy United States Air Force specifications for hydrolytic stability of hydraulic fluids. Test results are as follows:

| Compound | Hours | Appearance | |
|---|---|---|---|
| | | Silicate Phase | Aqueous Phase |
| di[tri(2-heptoxy)siloxy]-diethylsilane. | 400 | Clear---- | Clear. |
| same-------- | 432 | ---do----- | Do. |
| di[tri(2-butoxy)siloxy]-diphenylsilane. | 500 | ---do----- | Do. |
| same-------- | 504 | ---do----- | Very light precipitate. |
| di[tri(2-butoxy)siloxy]-diethylsilane. | 500 | ---do----- | Clear. |

The polysiloxanes of the invention as illustrated above are remarkably stable in the presence of water. This is a particularly desirable property for hydraulic fluids and lubricants. The polysiloxanes, as described, are still more desirable in that they are characterized by unusual thermal stability.

We claim:

1. Bis[tri(alkoxy)siloxy]dihydrocarbyl silanes wherein the alkoxy and hydrocarbyl groups contain from 2 to 10 carbon atoms each and the hydrocarbyl groups are members of the class consisting of alkyl and phenyl groups.

2. Trisiloxanes of the type having the general structural formula

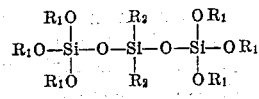

wherein the $R_1$'s represent alkyl radicals of from 2 to 10 carbon atoms each and the $R_2$'s represent hydrocarbyl radicals of 2 to 10 carbon atoms each selected from the group consisting of alkyl and phenyl radicals.

3. Di[tri(alkoxy)siloxy]dialkylsilanes wherein the alkoxy and alkyl groups contain from 2 to 10 carbon atoms each.

4. Di[tri(alkoxy)siloxy]diarylsilanes wherein the alkoxy and aryl groups contain from 2 to 10 carbon atoms each.

5. Di[tri(2-heptoxy)siloxy]diethylsilane.

6. Di[tri(2-butoxy)siloxy]diphenylsilane.

7. A process for preparing trisiloxanes which comprises reacting two moles of a trialkoxyhalosilane with one mole of a dihydrocarbylsilanediole in which the hydrocarbyl groups are members of the class consisting of alkyl and phenyl groups in the presence of a basic nitrogen-containing acid acceptor, the alkoxy and hydrocarbyl groups containing from 2 to 10 carbon atoms each.

8. A process for preparing trisiloxanes which comprises reacting two moles of a trialkoxysilanol with one mole of a dihydrocarbyldihalosilane in a reaction zone under anhydrous conditions, said alkoxy and hydrocarbyl groups containing from 2 to 10 carbyl atoms each and the hydrocarbyl groups being members of the class consisting of alkyl and phenyl groups, and passing nitrogen gas through the reaction zone to remove the hydrogen halide formed in the reaction.

References Cited in the file of this patent

UNITED STATES PATENTS

| | | |
|---|---|---|
| 2,114,866 | Vaughn | Apr. 19, 1938 |
| 2,486,162 | Hyde | Oct. 25, 1949 |
| 2,624,749 | Bunnell | Jan. 6, 1953 |
| 2,626,957 | Orkin | Jan. 27, 1953 |

FOREIGN PATENTS

| | | |
|---|---|---|
| 703,420 | Great Britain | Feb. 3, 1954 |